United States Patent [19]

Goll

[11] Patent Number: 4,642,249

[45] Date of Patent: Feb. 10, 1987

[54] CLEAR LACQUER BASED ON POLYVINYLIDENE FLUORIDE AND A PROCESS FOR THE COATING OF METALLIC SURFACES

[75] Inventor: Werner Goll, Garching, Fed. Rep. of Germany

[73] Assignee: Solvay & Cie, Societe Anonyme, Brussels, Belgium

[21] Appl. No.: 848,333

[22] Filed: Apr. 3, 1986

Related U.S. Application Data

[63] Continuation of Ser. No. 526,549, Aug. 26, 1983, abandoned.

[30] Foreign Application Priority Data

Sep. 16, 1982 [DE] Fed. Rep. of Germany ....... 3234397

[51] Int. Cl.$^4$ .............................................. B05D 3/02
[52] U.S. Cl. ................... 427/388.5; 524/297; 524/360; 524/378; 524/520
[58] Field of Search ............... 524/297, 360, 378, 520; 427/388.5

[56] References Cited

U.S. PATENT DOCUMENTS

| | | | |
|---|---|---|---|
| 3,324,069 | 6/1967 | Koblitz et al. | 524/520 |
| 3,454,518 | 7/1969 | Kelly | 524/520 |
| 3,944,689 | 3/1976 | Luckock et al. | 524/520 |

Primary Examiner—Joseph L. Schofer
Assistant Examiner—J. Reddick
Attorney, Agent, or Firm—Felfe & Lynch

[57] ABSTRACT

The present invention provides a clear lacquer based on polyvinylidene fluoride which comprises:
(a) 30 to 45 wt. % of polyvinylidene fluoride with a K value of 40 to 55,
(b) 4 to 15 wt. % of an acrylate resin,
(c) 33 to 50 wt. % of latent, high boiling solvent,
(d) 3 to 15 wt. % of low boiling solvent,
(e) 0.01 to 1.0 wt. % of flowing adjuvant,
(f) 0.01 to 0.95 wt. % of light protection agent. The present invention also provides a process for coating metallic surfaces, wherein this clear lacquer is applied to a metal surface and stoved at a temperature of from 250° to 350° C.

16 Claims, No Drawings

CLEAR LACQUER BASED ON POLYVINYLIDENE FLUORIDE AND A PROCESS FOR THE COATING OF METALLIC SURFACES

This application is a continuation of application Ser. No. 526,549, filed Aug. 26, 1983, now abandoned.

The present invention is concerned with a lacquer based upon polyvinylidene fluoride (PVDF), as well as with a process for coating metallic surfaces with this lacquer.

Polyvinylidene fluoride is characterised by a series of valuable properties which make its use as lacquer binding agent appear desirable. Thus, it is stable towards aggressive chemicals, such as inorganic acids and lyes, sulphur dioxide and the like. Furthermore, it is dirt-repellent, scratch resistant, weather resistant and is not broken down by UV irradiation.

Because of these advantageous properties, PVDF is used in order resistively to coat metal surfaces. However, it has been shown that the adhesive strength of the PVDF on metal is very poor so that a coating of metal with PVDF can only take place after the application of a primer which brings about the adhesion between the binding agent and the metal.

Attempts have been made to improve the adhesive strength and the film formation of the PVDF by the formation of copolymers. Thus, Federal Republic of Germany Patent Specification No. 16 69 018 discloses coating agents which consist of vinylidene fluoride polymer and a mixed polymer of a polymerisable, unsaturated, aldehyde-modified carboxylic acid amide and at least one other co-polymerisable, ethylenically unsaturated monomer. The addition of these resins improves the adhesion of the protective films on metals but, in the case of clear lacquer, this is only satisfactory in the presence of an epoxy primer.

Therefore, it is an object of the present invention to provide a clear lacquer based upon polyvinylidene fluoride which, even without the help of a primer, makes possible a satisfactory adhesive strength on metallic surfaces and, at the same time, displays the valuable properties of the PVDF.

Thus, according to the present invention, there is provided a clear lacquer based upon polyvinylidene fluoride, which comprises:

(a) 30 to 45 wt.% of polyvinylidene fluoride with a K value of 40 to 55,
(b) 4 to 15 wt.% of acrylic resin,
(c) 33 to 50 wt.% of latent, high boiling solvent,
(d) 3 to 15 wt.% of low boiling solvent,
(e) 0.01 to 1.0 wt.% of flowing adjuvant,
(f) 0.01 to 0.95 wt.% of light protection agent.

We have found that a clear lacquer with this composition makes possible a very good and lasting coating of metal surfaces but does not impair the other advantageous properties of the polyvinylidene fluoride. Also with regard to the film forming properties of the lacquer according to the present invention, no problems arise.

The clear lacquer according to the present invention contains from 30 to 45 wt.% of polyvinylidene fluoride, the PVDF preferably being used in an amount of from 30 to 40 wt.%. PVDF which has been produced by emulsion polymerisation is thereby most suitable.

The mechanical properties of the lacquer film formed are governed by the K value of the PVDF used. The K value according to Fikentscher is a specific constant for polymers, which is also called the "inherent viscosity". This K value is a measure of the average polymerisation stage and is determined according to German Industrial Standard No. 53726. A low K value thereby means a low degree of polymerisation and thus a low molecular weight.

We have now, surprisingly, ascertained that PVDF with a relatively low K value of from 40 to 55 makes possible the production of an especially well-adhering clear lacquer.

The proportion of acrylic resin in the clear lacquer according to the present invention is from 4 to 15 wt.%, the range of from 8 to 12 wt.% being especially preferred. The resin may consist of the amides and/or esters of acrylic acid and/or of methacrylic acid. As acrylic polymers, there are especially preferred acrylamide, methacrylamide, methyl acrylate, methyl methacrylate, ethyl acrylate, ethyl methacrylate, butyl acrylate and butyl methacrylate, as well as mixtures and copolymers thereof.

Latent, high boiling solvents in the scope of the present invention are solvents which only dissolve the PVDF at an elevated temperature, the PVDF being present therein at ambient temperature as dispersed fine particles. Such solvents are preferably isophorone, propylene carbonate, dimethylformamide and alkyl phthalates, dibutyl phthalate being especially preferred. The latent, high boiling solvents are added in an amount of from 33 to 50 wt.%, the range of from 38 to 48 wt.% being preferred.

As low boiling solvents, there can be used xylene, ethylene glycol acetate and all solvents with a boiling point below 125° C. Xylene, ethyl glycol acetate and toluene having been found to be especially suitable. These solvents are used in an amount of from 3 to 15 wt.%.

For the production of the clear lacquer according to the present invention, lacquer adjuvants are also needed. Usually, there is added to the clear lacquer a flowing adjuvant in an amount of from 0.01 to 1.0 wt.%, the flowing adjuvant preferably being added in an amount of from 0.01 to 0.5 wt.%. The use of a silicone oil has thereby proved to be suitable. In an especially preferred embodimental form, there is used Monoflor 53 (a non-ionic fluorinated ester) or Anti Terra U (a salt of long-chained polyamine amides and high molecular weight acidic esters).

Furthermore, there is added to the clear lacquer a light protection agent in an amount of from 0.01 to 0.95 wt.%, the stabilisation against the action of light preferably being achieved by the use of UV absorbers based upon benzotriazole derivatives.

The coating of metal surfaces with the clear lacquer according to the present invention can take place by the usual methods of application, such as painting, spraying or the like. After coating, the clear lacquer is stoved at a temperature of from 250° to 350° C. and preferably at a temperature of from 280° to 320° C. Depending upon the temperature used, the stoving time is from 1 to 10 minutes and especially from 3 to 5 minutes.

The coating with the clear lacquer according to the present invention gives a dry layer thickness of 10 to 17 μm.

The clear lacquer according to the present invention can be used for coating all metal surfaces and is especially suitable for coating steel, copper and aluminium.

Thus, the present invention provides a clear lacquer which is characterised not only by a good stability and resistivity but also by a good adhesive strength. With the help of this clear lacquer, it is possible to apply a strongly adhering coating to metal surfaces which has the valuable properties of the PVDF.

The following Examples are given for the purpose of illustrating the present invention:

The percentage proportion of the loosened off squares gives a good indication of the adhesive strength.

Table II gives the results of the adhesion testing. It follows quite clearly from this that the clear lacquer according to the present invention has a better adhesive strength than the clear lacquer tested by way of comparison.

TABLE I

| Example | Composition of the lacquer | | | | | |
|---|---|---|---|---|---|---|
| | comparison 1 | acc. to inv. 2 | comparison 3 | acc. to inv. 4 | comparison 5 | acc. to inv. 6 |
| PVDF (wt. %) | 42.75 | 42.75 | 38.00 | 38.00 | 33.25 | 33.25 |
| K value of the PVDF | 70–85 | 40–55 | 70–85 | 40–55 | 70–85 | 40–55 |
| poly(meth)acrylate (Paraloid B 44) | 4.75 | 4.75 | 9.50 | 9.50 | 14.25 | 14.25 |
| PVDF: acrylate | 90:10 | 90:10 | 80:20 | 80:20 | 70:30 | 70:30 |
| Anti Terra U ® | 0.40 | 0.40 | 0.40 | 0.40 | 0.40 | 0.40 |
| Monoflor 53 ® | 0.01 | 0.01 | 0.01 | 0.01 | 0.01 | 0.01 |
| xylene | 2.00 | 2.00 | 2.00 | 2.00 | 2.00 | 2.00 |
| EGA* | 11.30 | 11.30 | 11.30 | 11.30 | 1.55 | 1.55 |
| dibutyl phthalate | 3.00 | 3.00 | 3.00 | 3.00 | 3.00 | 3.00 |
| isophorone | 35.15 | 35.15 | 35.03 | 35.03 | 44.94 | 44.94 |
| light protection agent | 0.64 | 0.64 | 0.76 | 0.76 | 0.60 | 0.60 |
| efflux time cup 4 mm. | 44 sec. | 31 sec. | 138 sec. | 115 sec. | 460 sec. | 400 sec. |

*EGA = ethylglycol acetate

TABLE II

| Carrier material | Example | Adhesive strength of the clear lacquers | | | | | |
|---|---|---|---|---|---|---|---|
| | | 1 C | 2 I | 3 C | 4 I | 5 C | 6 I |
| steel (Bonder 901) | stoving temperature (°C.) | 300 | 300 | 300 | 300 | 300 | 300 |
| | stoving time (min.) | 3 | 3 | 3 | 3 | 3 | 3 |
| | dry film thickness (μm) | 17 | 17 | 17 | 17 | 21 | 20 |
| | lattice cut (cupping 8 mm.) | 5 | 3 | 4 | 2 | 2 | 0 |
| aluminium (Alodine 1200) | stoving temperature (°C.) | 300 | 300 | 300 | 300 | 300 | 300 |
| | stoving time (min.) | 3 | 3 | 3 | 3 | 3 | 3 |
| | dry film thickness (μm) | 15 | 15 | 15 | 15 | 18 | 18 |
| | lattice cut (cupping 6 mm.) | 5 | 2–3 | 4 | 0 | 0 | 0 |
| copper sheet | stoving temperature (°C.) | 300 | 300 | 300 | 300 | 300 | 300 |
| | stoving time (min.) | 4 | 4 | 4 | 4 | 4 | 4 |
| | dry film thickness (μm) | 15 | 15 | 16 | 16 | 14 | 15 |
| | lattice cut (cupping 8 mm.) | 3–4 | 1–2 | 4 | 0–1 | 2 | 2 |

C = comparison lacquer
I = lacquer according to the invention

EXAMPLES 1 to 6

Clear lacquers of differing composition are tested, clear lacquers based upon polyvinylidene fluoride with a K value of 70 to 85 thereby being compared with clear lacquers according to the present invention based upon polyvinylidene fluoride with a K value of from 40 to 55. The precise compositions of the individually tested clear lacquers are given in Table I. Examples 1, 3 and 5 are comparative examples, whereas Examples 2, 4 and 6 are examples of clear lacquers according to the present invention.

The lacquers are applied to various metal carriers, such as steel, aluminium and copper. By stoving at various temperatures, there is produced a dry film layer of 10 to 17 μm. thickness. For adhesion testing, there is used the Erichsen cupping in the lattice cut according to German Industrial Standard No. 53 156, which is broadened insofar as, before the cupping, a lattice cut is applied to the coated material. A cupping of up to several millimeters is then carried out. The middle point of the lattice cut must lie in the middle of the cupping dome. Over the dome there is pressed on an adhesive band (Tesafilm or 3M) which is then jerkily pulled off.

I claim:

1. A clear polyvinylidene fluoride lacquer which comprises:
    (a) 30 to 45 wt.% of polyvinylidene fluoride with a K value of 40 to 55,
    (b) 4 to 15 wt.% of an acrylic resin selected from the group consisting of amides and esters of acrylic or methacrylic acid,
    (c) 33 to 50 wt.% of latent, high boiling solvent which dissolves polyvinylidene fluoride only at an elevated temperature, and
    (d) 3 to 15 wt.% of low boiling solvent having a boiling point up to the boiling point of ethyl glycol acetate.

2. The clear lacquer of claim 1 containing 30 to 40 wt.% of the polyvinylidene fluoride with a K-value of 40 to 55.

3. The clear lacquer of claim 1 containing 8 to 12 wt.% of the acrylic resin.

4. The clear lacquer of claim 1 wherein the acrylic resin is a polymer comprising acrylamide, methacrylamide, methyl methacrylate, butyl acrylate, butyl methacrylate or a combination thereof.

5. The clear lacquer of claim 1 wherein the latent, high boiling solvent is isophorone, an alkyl phthalate or a combination thereof.

6. The clear lacquer of claim 5, wherein the alkyl phthalate is dibutyl phthalate.

7. The clear lacquer of claim 1 comprising 38 to 48 wt.% of the latent, high boiling solvent.

8. The clear lacquer of claim 1 wherein the low boiling solvent is xylene, ethyl glycol acetate or a combination thereof.

9. The clear lacquer of claim 1 further comprising 0.01 to 1.0 wt.% of a flowing adjuvant.

10. The clear lacquer of claim 1 further comprising 0.01 to 0.95 wt.% of a light protection agent.

11. A process for coating metallic surfaces, comprising the steps of applying the clear lacquer of claim 1 to a metal surface and thereafter heating the lacquer coated on the surface, to a temperature of from 250° to 350° C.

12. The process of claim 11, wherein the lacquer is heated to a temperature of from 280° to 320° C.

13. The process of claim 11 wherein the heating is carried out for 1 to 10 minutes.

14. The process of claim 13, wherein the heating is carried out for 3 to 5 minutes.

15. The process of claim 11 wherein a steel, aluminum or copper surface is coated with the clear lacquer.

16. The clear lacquer of claim 1 further comprising 0.01 to 0.5 wt.% of a flowing adjuvant and 0.6 to 0.9 wt.% of a light protection agent.

* * * * *